United States Patent [19]

Owl, Jr.

[11] 4,395,007
[45] Jul. 26, 1983

[54] ACTUATION SYSTEM FOR A CONTROL SURFACE OF AN AIRCRAFT

[75] Inventor: George A. Owl, Jr., Gardena, Calif.

[73] Assignee: Rockwell International Corporation, El Segundo, Calif.

[21] Appl. No.: 206,597

[22] Filed: Nov. 13, 1980

[51] Int. Cl.³ .............................................. B64C 3/50
[52] U.S. Cl. ................................ 244/215; 244/75 R; 244/90 R; 244/225
[58] Field of Search .................. 244/75 R, 90 R, 201, 244/212, 213, 214, 215, 225, 226, 216; 74/96

[56] References Cited

U.S. PATENT DOCUMENTS

| | | | |
|---|---|---|---|
| 2,218,114 | 10/1940 | Kunze | 244/216 |
| 2,383,845 | 8/1945 | Couzinet | 244/90 R |
| 2,395,671 | 2/1946 | Kleinhans et al. | 244/82 |
| 2,407,401 | 9/1946 | Clauser et al. | 244/225 |
| 2,984,436 | 5/1961 | Murray et al. | 244/85 |
| 3,756,089 | 9/1973 | Haladay | 244/213 |
| 4,053,124 | 10/1977 | Cole et al. | 219/215 |
| 4,131,253 | 12/1978 | Zapel et al. | 219/215 |
| 4,181,275 | 1/1980 | Moelter et al. | 213/215 |
| 4,248,395 | 2/1981 | Cole | 244/216 |

Primary Examiner—Charles E. Frankfort
Attorney, Agent, or Firm—Charles T. Silberberg

[57] ABSTRACT

An actuation system for rotating a control surface mounted on an aircraft airfoil, the control surface being rotatable about a first axis at an acute angle to the longitudinal axis of the aircraft is disclosed. The invention comprises a first crank having a first end and a second end pivotally mounted to the airfoil and rotatable about a spanwise second axis substantially perpendicular to the longitudinal axis of the aircraft. A second crank is pivotally mounted at its first end to the first crank and is rotatable about a third axis which is substantially perpendicular to the second axis. The second end of the second crank is pivotally mounted to the control surface. The second end of the second crank is rotatable about a fourth axis substantially perpendicular to the second and third axes. An actuator, substantially aligned with the longitudinal axis of the aircraft, is coupled to the airfoil and to the first end of the first crank. Thus, upon extension or retraction of the actuator in a direction parallel to the longitudinal axis of the aircraft the first and second cranks rotate about the second axis, causing the control surface to rotate about the first axis, and further to rotate relative to each other to accommodate the motion of the second end of the second crank in a plane perpendicular to the first axis caused by its attachment to the control surface.

5 Claims, 4 Drawing Figures

ACTUATION SYSTEM FOR A CONTROL SURFACE OF AN AIRCRAFT

BACKGROUND OF INVENTION

1. Field of Invention

The invention relates to the field of actuation systems for positioning a control surface mounted on an aircraft airfoil, and in particular, to aircraft having swept wings and externally mounted actuators.

2. Description of Prior Art

In conventional commercial and military transports, and general aviation type aircraft, airfoil cross-sections are relatively thick and provide ample room to mount actuators for the control surfaces within the airfoil envelope. But with modern high-speed, and in particular, supersonic fighter type aircraft, airfoils are relatively thin. Locating the actuator within this type of airfoil tends to occupy too much space and complicates airfoil structural design. Advanced materials, such as graphite expoxy composites, permit aerodynamic improvements by allowing the use of even thinner airfoils which would make it impossible to incorporate the actuators within the airfoil structure. This, in some instances, has led to unusual placement of the actuator system within the airfoil. For example, U.S. Pat. No. 2,984,436, "Control Means For Airfoils," by J. B. Murray, et al. Murray, et al; places the hydraulic actuator substantially parallel to the axis of rotation of the control surface (in a spanwise direction). Each end of the actuator is coupled to one end of a bellcrank, mounted at its center to the airfoil structure. A link is pivotally attached between the opposite end of each bellcrank and to the control surface. Thus, spanwise extension and retraction of the actuator is converted into longitudinal movement of the link, which rotates the control surface about its hinge axis. While this design is compact, space within the airfoil is still occupied by the actuator, reducing the fuel storage capacity of the airfoil. This actuator system can also complicate the structural design of the airfoil. Other examples of control surface actuation systems using internally mounted actuators are disclosed in U.S. Pat. Nos. 4,053,124, "Variable Camber Airfoil," by J. B. Cole and 4,131,253, "Variable Camber Trailing Edge For Airfoil," by E. J. Zapel.

To avoid these problems it is quite common to externally mount the hydraulic cylinders as disclosed in U.S. Pat. No. 4,181,275, "Apparatus For Operating Flap Means Secured To the Wings of An Aircraft", by G. Moelter et al. The Moelter, et al., system mounts the actuator below the airfoil and controls the position of the control surface through a sophisticated linkage system. The problem here is, if the wing is swept the movement of the point of connection of the actuator to the linkage coupled to the surface moves out of the plane of the direction of actuation as the control surface rotates. Thus, one end of the actuator must be capable of translating in a spanwise direction. This, requires the actuator fairing (necessary for drag reduction) be larger than would be needed if the actuator did not have to translate in the spanwise direction. That portion of the fairing which moves with the control surface does not move in the streamwise plane of the fixed fairing, causing transverse displacement between the two, and additional drag. Of course the larger fairing results in greater drag. Another example of an externally mounted hydraulic actuator can be found in U.S. Pat. No. 2,395,671, "Control Means For Airfoils," by E. S. Kleinhans, et al.

It is therefore a primary object of this invention to provide an actuator system for positioning a control surface mounted on a swept airfoil of an aircraft which compensates for the relative motion of the control surface relative to the longitudinal axis of the aircraft.

It is another object of this invention to provide an actuation system having an externally mounted actuator for positioning a control surface mounted on a swept airfoil of an aircraft which minimizes the size of the fairing necessary to enclose the actuator.

SUMMARY OF INVENTION

The invention is an actuation system for the positioning of a control surface mounted on an aircraft airfoil, the control surface being rotatable about a first axis at an acute angle to the longitudinal axis of the aircraft. The actuation system comprises a first crank having a first end and a second end, pivotally mounted to the airfoil and rotatable about a second axis substantially perpendicular to the longitudinal axis of the aircraft first axis. A second crank is pivotally mounted at its first end to the first crank and is rotatable about a third axis which is substantially perpendicular to the second axis. The second end of the second crank is rotatable about a fourth axis substantially perpendicular to the second and third axes. An actuator is pivotally coupled to the aircraft and to the first end of the first crank.

Thus, upon extension or retraction of the actuator in a direction parallel to the longitudinal axis of the aircraft, the first and second cranks rotate about the second axis, causing the control surface to rotate about the first axis, and further to rotate relative to each other to accommodate the motion of the second end of the second crank in a plane perpendicular to the first axis caused by its attachment to the control surface.

In a preferred embodiment the first, second, third and fourth axes intersect at a common point. In another embodiment the third axis is offset from the second axis and the attachment of the second end of the second crank to the control surface is free to translate along the fourth axis as the control surface rotates in order to compensate for the offset of the second and third axes.

The novel features which are believed to be characteristic of the invention, both as to its organization and its method of operation, together with further objects and advantages thereof, will be better understood from the following description in connection with the accompanying drawings in which presently preferred embodiments are illustrated by way of examples. It expressly is to be understood, however, that the drawings are for purposes of illustration and description only, and are not intended as a definition of the limits of the invention.

BRIEF DESCRIPTION OF THE DRAWINGS

Illustrated in FIG. 1 is a partial planform view of an aircraft looking upward from beneath.

Illustrated in FIG. 2 is a side elevation view of the actuator system for the control surface taken along the lines 2—2 of FIG 1.

Figure 3:
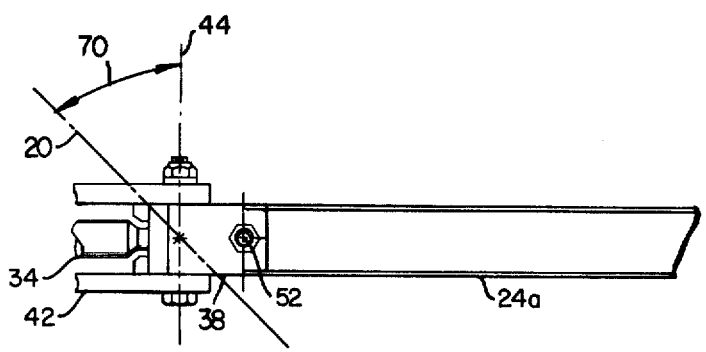
Figure 2:
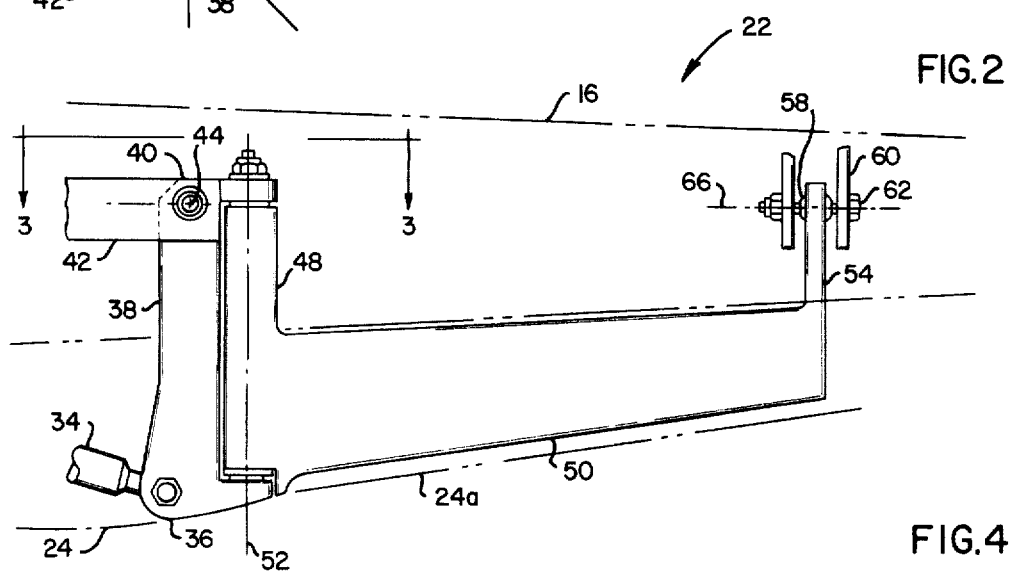

Illustrated in FIG. 3 is a partial view of the actuator system shown in FIG. 2 looking downward taken along the lines 3—3.

Figure 4:
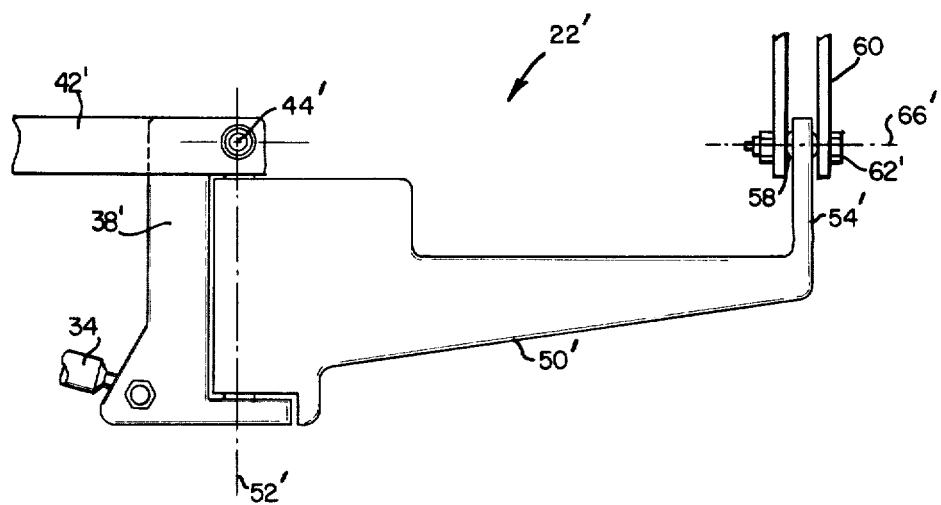

Illustrated in FIG. 4 is a side elevation view of a modified version of the actuator system shown in FIG. 2.

DESCRIPTION OF PREFERRED EMBODIMENT

Figure 1:
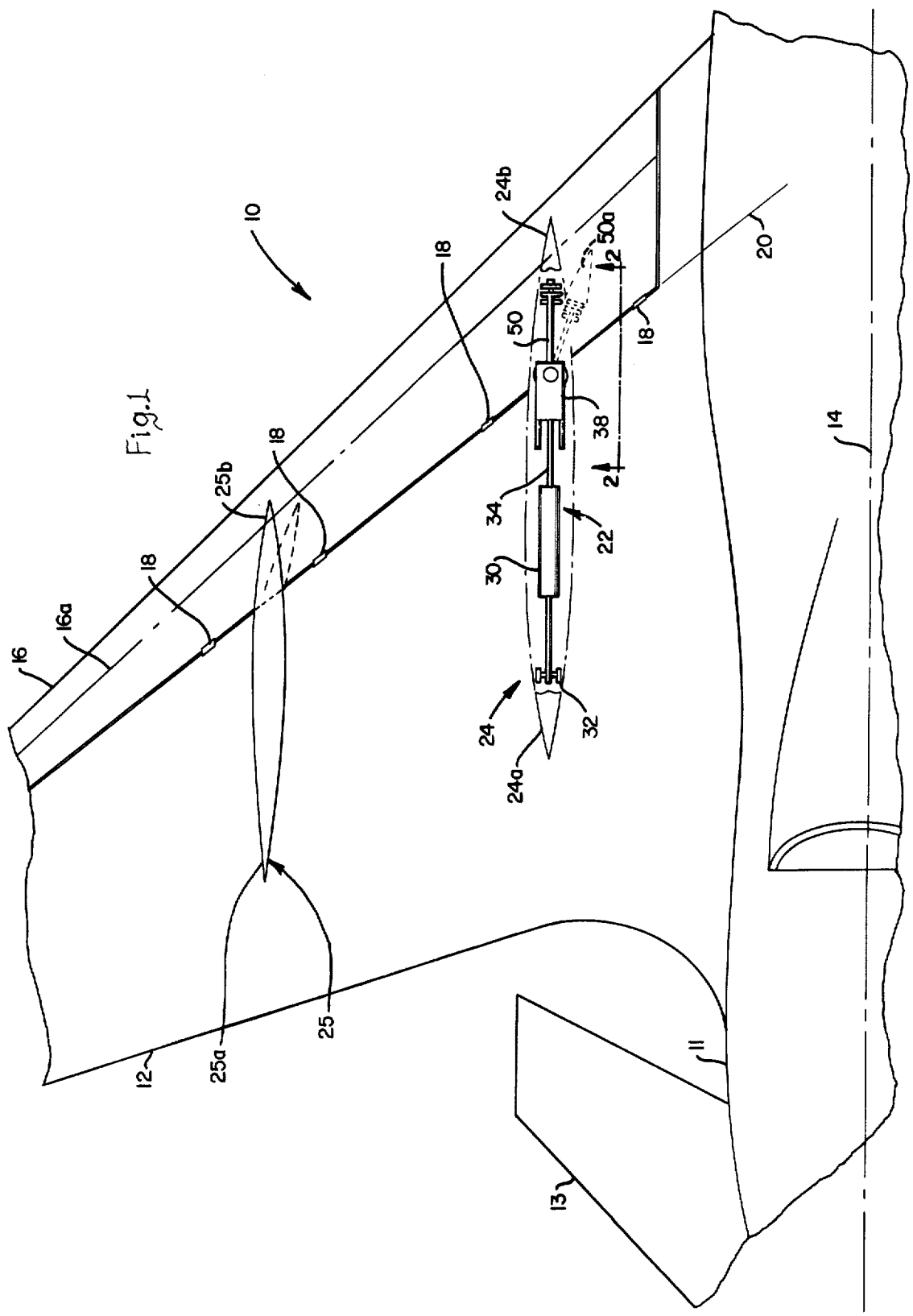

Illustrated in FIG. 1 is a partial view of the underside of an aircraft generally designated by numeral 10 having a fuselage 11, a forward swept airfoil in the form of wing 12, and forward mounted canard 13. The longitudinal axis of the aircraft 10 is designated by numeral 14. The wing 12 incorporates a control surface in the form of an elevon 16 mounted thereto by hinges 18 and, thus, rotatable about a hinge axis 20. The position of the elevon 16 is controlled by a pair of actuator systems 22 mounted within fairings 24 and 25 (the actuator system in fairing 25 is not shown). The fairings 24 and 25 are divided into first sections 24a and 25a attached to the wing 12 and second sections 24b and 25b attached to the elevon 16 and rotatable therewith.

Illustrated in FIG. 2 is a side elevation view of the actuator system 22 shown in FIG. 1 along the lines 2—2. Illustrated in FIG. 3 is a view looking downward on the actuator system shown in FIG. 2 along the lines 3—3. Referring to FIGS. 1–3, it can be seen that the actuator system 22 comprises an actuator 30 preferably hydraulic, pivotally coupled at one end to wing structure 32 such that it can rotate in a plane parallel to the longitudinal axis 14 of the aircraft. The piston rod 34 of the actuator 30 is pivotally coupled to the first end 36 of a first crank 38. The first crank 38 is pivotally attached at its second end 40 to a clevis 42 mounted to the wing 12 structure, and has a spanwise axis of rotation 44 substantially perpendicular to the longitudinal axis of the aircraft, and which, preferably, substantially intersects the axis of rotation 20 as of the elevon 16. Rotatably mounted at its first end 48 to the first crank 38 is a second crank 50. The axis of rotation 52 of the second crank 50 is substantially perpendicular to the axis of rotation 44 of the first crank 38. The second end 54 of the second crank 50 incorporates a spherical bearing 58 which is secured to a clevis 60 (attached to the elevon 16 structure) by means of fastener 62 extending therethrough. The crank 50 is free to rotate relative to elevon 16 about a fourth axis of rotation 66, which is perpendicular to the second and third axes of rotations 44 and 52, respectively and preferably, substantially intersects the intersection point of the first and second axes of rotation 20 and 44, respectively. The spherical bearing 58 also is adapted to translate along the axis of rotation 66 of the bearing 58.

Thus, it can be seen that upon the extension of the actuator 30, first crank 38 is rotated about axis 44 causing second crank 50 to rotate upward. This movement causes elevon 16 to rotate upward about its hinge axis 20 to a position indicated by numeral 16a. Note also that axis of rotation 66 rotates in a plane perpendicular to large axis 20. But since the axis of rotation 44 of the first crank 38 is at an angle indicated by numeral 70 to the axis of rotation 20 of elevon 16, the second crank 50 rotates about its axis of rotation 52 towards the fuselage 11, a position indicated by numeral 50a. Angular changes between the second crank 50 and the elevon 16 are absorbed by spherical bearing 58. Additionally, because the axis of rotation 44 of the first crank 38 is offset from the axis of rotation 52 of the second crank 50, the bearing 58 is designed to be free to translate along the axis of rotation 66; i.e., along fastener 62. This is provided by the slideably mounted bearing 58 on fastener 62. When the actuator is retracted, the elevon 16 rotates downward and the second crank 50 rotates in a direction away from the fuselage.

Thus, it can be seen that the actuator need only extend and retract in a plane parallel to the longitudinal axis 14 of the aircraft, and no spanwise rotation about wing structure 32 occurs. Therefore, the fairing 24 can be made smaller than if rotation were required, allowing a reduction in drag.

Illustrated in FIG. 4 is a modified version of the actuation system 22 shown in FIG. 2. The first crank 38' is pivotally attached to clevis 42' as before and coupled to rod 34 and rotatable about axis 44'. The second crank 50', is pivotally mounted such that its axis of rotation 52' intersects and is perpendicular to axis 44'. In this configuration, the end 54' of the second crank 50' need not be designed to translate along axis 66' on fastener 62', provided axis 66', 52', and 44' intersect a common point. Thus, the clevis 60 can be made smaller.

While the actuation system for a control surface of an airfoil has been described with reference to particular embodiments, it should be understood that such embodiments are merely illustrative as there are numerous variations and modifications which may be made by those skilled in the art. Thus, the invention is to be construed as being limited only the spirit and scope of the appended claims.

Therefore I claim:

1. An actuation system for positioning a control surface mounted on an aircraft airfoil, said control surface being rotatable about a first axis at an acute angle to the longitudinal axis of said aircraft, comprising:
   a first crank having a first end and a second end, said second end being pivotally mounted to said airfoil, said first crank being rotatable about a second axis substantially perpendicular to said longitudinal axis;
   a second crank having a first end pivotally mounted to said first crank rotatable about a third axis substantially perpendicular to said second axis, said second crank having a second end pivotally mounted to said control surface rotatable about a fourth axis substantially perpendicular to said second and third axes; and
   an actuator coupled to said airfoil and to said first end of said first crank,
   such that upon extension or retraction of said actuator in a direction parallel to said longitudinal axis of said aircraft said control surface is rotated by rotation of said first and second cranks, said first and second cranks rotating relative to each other to compensate for the relative change of position of said control surface relative to said longitudinal axis of said aircraft.

2. The actuation system of claim 1 wherein said first and second axes substantially intersect at a common point.

3. The actuation system of claim 2 wherein said third axis substantially intersects said common point.

4. The actuation system of claim 3 wherein said fourth axis substantially intersects said common point.

5. The actuation system of claim 1 wherein said second and third axes are offset from each other, and said second crank is adapted to translate along said fourth axis as said control surface rotates.

* * * * *